United States Patent
Niglas et al.

(10) Patent No.: US 10,442,418 B2
(45) Date of Patent: *Oct. 15, 2019

(54) VALVE SYSTEM AND METHOD FOR CONTROLLING SAME

(71) Applicant: Bendix Commercial Vehicle Systems LLC, Elyria, OH (US)

(72) Inventors: Paul C. Niglas, Avon, OH (US); Michael D. Tober, Avon, OH (US); Randy J. Salvatora, North Olmsted, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 14 days.

This patent is subject to a terminal disclaimer.

(21) Appl. No.: 15/470,208

(22) Filed: Mar. 27, 2017

(65) Prior Publication Data

US 2018/0273012 A1    Sep. 27, 2018

(51) Int. Cl.
   *B60T 7/20*      (2006.01)
   *B60T 8/17*      (2006.01)
   (Continued)

(52) U.S. Cl.
   CPC ........... B60T 15/18 (2013.01); *B60T 7/20* (2013.01); *B60T 8/1708* (2013.01);
   (Continued)

(58) Field of Classification Search
   CPC ........ B60T 13/04; B60T 13/588; B60T 17/04; B60T 8/327; B60T 8/17555;
   (Continued)

(56) References Cited

U.S. PATENT DOCUMENTS

| | | |
|---|---|---|
| 4,054,327 A | 10/1977 | Rebenstorf |
| 4,112,961 A | 9/1978 | Horowitz |

(Continued)

FOREIGN PATENT DOCUMENTS

| | | |
|---|---|---|
| CA | 2000767 A1 | 4/1990 |
| CN | 102991493 A | 3/2013 |

(Continued)

OTHER PUBLICATIONS

International Search Report for counterpart International Application No. PCT/US2018/024532, dated Jul. 13, 2018, 6 pages.

(Continued)

*Primary Examiner* — Robert A. Siconolfi
*Assistant Examiner* — San M Aung
(74) *Attorney, Agent, or Firm* — Brian Kondas; Cheryl Greenly; Eugene Clair

(57) ABSTRACT

A valve system includes an isolation check valve delivering pneumatic fluid as a supply pressure, a double-check valve adapted to deliver a braking demand control signal of the pneumatic fluid based on a higher of a first braking demand in a first pneumatic braking circuit and a second braking demand in a second pneumatic braking circuit, and a control module. The control module is adapted to receive the supply pressure as a control module supply pressure of the pneumatic fluid, receive a control module control pressure of the pneumatic fluid based on the braking demand control signal, and deliver a control module delivery pressure of the pneumatic fluid based on the control module supply pressure and the control module control pressure. A tractor protection module delivers the pneumatic fluid at the control module delivery pressure based on a trailer park brake pressure of the pneumatic fluid.

26 Claims, 5 Drawing Sheets

(51) Int. Cl.
*B60T 13/68* (2006.01)
*B60T 15/04* (2006.01)
*B60T 15/18* (2006.01)

(52) U.S. Cl.
CPC .......... *B60T 13/683* (2013.01); *B60T 15/041* (2013.01); *B60T 2201/06* (2013.01)

(58) Field of Classification Search
CPC ...... B60T 8/1887; B60T 8/341; B60T 15/041; B60T 15/18; B60T 15/206; B60T 15/226; B60T 15/246; B60T 15/181; B60T 11/108; B60T 11/21; B60W 10/18; B60W 30/18118; F16K 31/0606; Y10T 137/87217; Y10T 137/87233
USPC .................................. 303/3, 17, 124; 701/78
See application file for complete search history.

(56) References Cited

U.S. PATENT DOCUMENTS

| | | | |
|---|---|---|---|
| 5,061,015 A | 10/1991 | Cramer et al. | |
| 5,492,204 A | 2/1996 | Wallace | |
| 6,785,980 B1 | 9/2004 | Koelzer | |
| 6,858,066 B2 | 2/2005 | Quinn et al. | |
| 6,971,404 B2 | 12/2005 | Simmons, Jr. | |
| 8,282,173 B2 | 10/2012 | Förster et al. | |
| 8,297,713 B2 | 10/2012 | Soupal | |
| 2005/0116533 A1* | 6/2005 | Herges | B60T 13/263 303/3 |
| 2008/0030068 A1* | 2/2008 | Bensch | B60T 7/20 303/17 |
| 2008/0258542 A1 | 10/2008 | Soupal | |
| 2009/0256416 A1 | 10/2009 | Bensch et al. | |
| 2009/0309413 A1* | 12/2009 | Bensch | B60T 8/362 303/20 |
| 2010/0078988 A1* | 4/2010 | Bensch | B60T 13/683 303/3 |
| 2011/0193407 A1* | 8/2011 | Wohltmann | B60T 8/327 303/139 |
| 2017/0072930 A1* | 3/2017 | Leinung | B60T 13/683 |
| 2017/0313293 A1* | 11/2017 | Bjornelund | B60T 13/261 |

FOREIGN PATENT DOCUMENTS

| | | |
|---|---|---|
| DE | 102006041009 A1 | 3/2008 |
| DE | 102006041011 A1 | 3/2008 |
| GB | 1563524 A | 3/1980 |
| WO | 2016177475 A1 | 11/2016 |

OTHER PUBLICATIONS

Written Opinion of the International Searching Authority for counterpart International Application No. PCT/US2018/024532, dated Jul. 13, 2018, 7 pages.

* cited by examiner

VALVE SYSTEM AND METHOD FOR CONTROLLING SAME

BACKGROUND

The present invention relates to a tractor protection function. It finds particular application in conjunction with delivering pneumatic fluid from a tractor to a trailer based on a trailer park brake pressure and will be described with particular reference thereto. It will be appreciated, however, that the invention is also amenable to other applications.

Current trailer control strategies involve using a relay valve to apply full system air pressure to a supply port of an antilock braking system (ABS) modulator. The ABS modulator is set to hold off pressure, and pulses to send a set volume of air into the trailer control line to apply trailer brakes. However, there is no mechanism to compensate for any loss of air volume in the trailer and/or verify that the required air pressure has been delivered to the trailer.

The present invention provides a new and improved apparatus and method for compensating for any loss of air volume in the trailer and/or verifying that the required air pressure has been delivered to the trailer.

SUMMARY

In one aspect of the present invention, it is contemplated that a valve system includes an isolation check valve delivering pneumatic fluid as a supply pressure, a double-check valve adapted to deliver a braking demand control signal of the pneumatic fluid based on a higher of a first braking demand in a first pneumatic braking circuit and a second braking demand in a second pneumatic braking circuit, and a control module. The control module is adapted to receive the supply pressure as a control module supply pressure of the pneumatic fluid, receive a control module control pressure of the pneumatic fluid based on the braking demand control signal, and deliver a control module delivery pressure of the pneumatic fluid based on the control module supply pressure and the control module control pressure. A tractor protection module delivers the pneumatic fluid at the control module delivery pressure based on a trailer park brake pressure of the pneumatic fluid.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
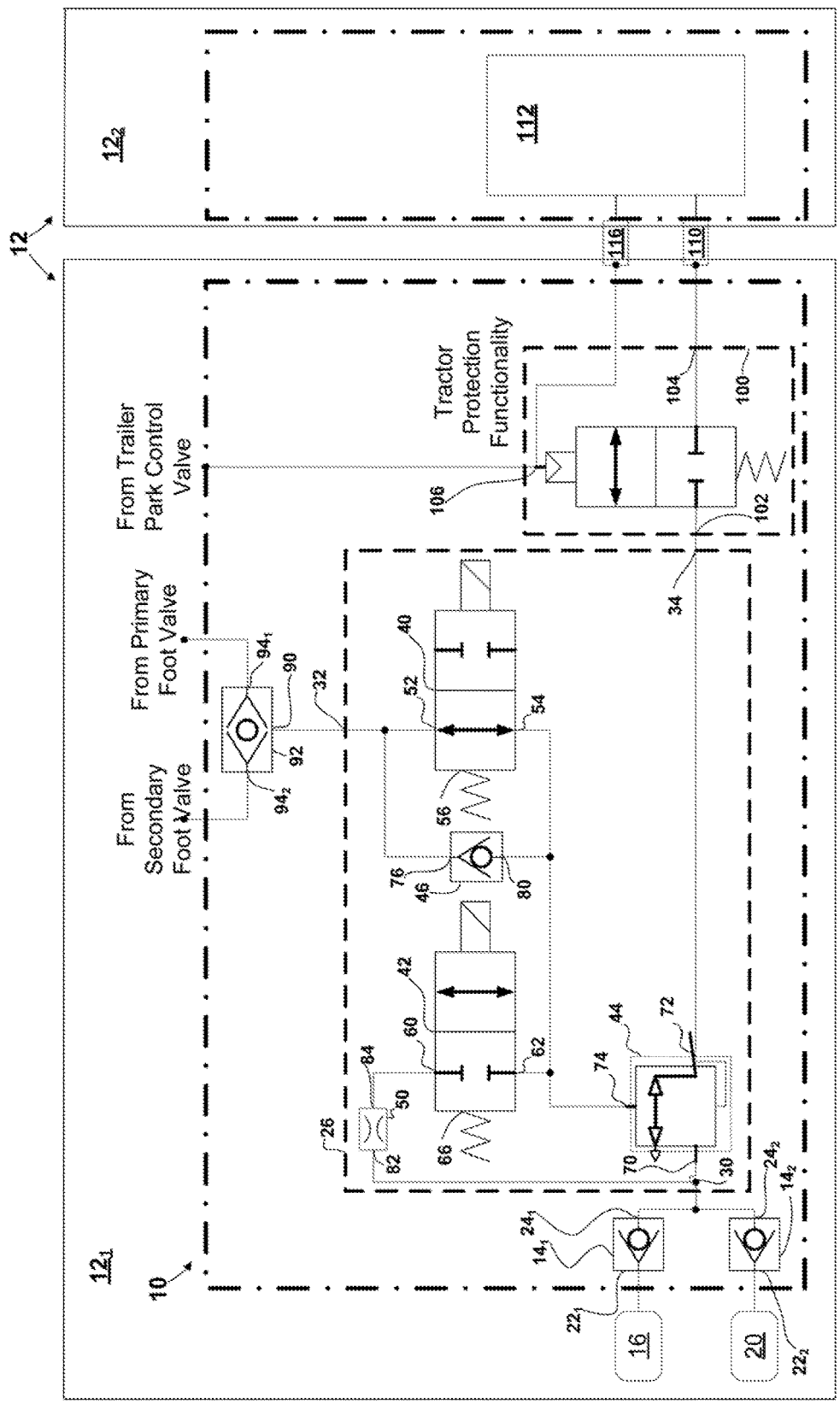
FIG. 1 illustrates a schematic representation of a simplified component diagram of an exemplary valve system in a first state while an associated vehicle is in a first state in accordance with one embodiment of an apparatus illustrating principles of the present invention.

With reference to FIG. 1, a simplified component diagram of an exemplary valve system 10 is illustrated in accordance with one embodiment of the present invention. The valve system 10 is part of an associated vehicle combination 12, which includes a tractor $12_1$ and a trailer $12_2$, and includes at least one isolation check valve $14_1$, $14_2$ (e.g., two (2) check valves collectively referenced as 14). The first isolation check valve $14_1$ receives a pneumatic fluid (e.g., air) from a first source such as, for example, a first reservoir 16, and the second isolation check valve $14_2$ receives the pneumatic fluid from a second source such as, for example, a second reservoir 20. It is to be assumed that the first and second reservoirs 16, 20 are part of respective fluidly independent pneumatic circuits. The first isolation check valve $14_1$ includes a first pneumatic supply port $22_1$ and a first pneumatic delivery port $24_1$. The second isolation check valve $14_2$ includes a second pneumatic supply port $22_2$ and a second pneumatic delivery port $24_2$. The first pneumatic delivery port $24_1$ fluidly communicates with the second pneumatic delivery port $24_2$. A higher of the respective pressures (e.g., supply pressures) of the pneumatic fluid at the first and second pneumatic supply ports $22_{1,2}$ is present at both the first and second pneumatic delivery ports $24_{1,2}$.

A control module 26 includes a supply port 30, a control port 32, and a delivery port 34. The control module 26 also includes a first control valve 40, a second control valve 42, a relay valve 44, a control module check valve 46, and a restrictor 50. The first control valve 40 includes a supply port 52 (e.g., a pneumatic supply port), a delivery port 54 (e.g., a pneumatic delivery port) and a control port 56 (e.g., an electrical control port). The second control valve 42 includes a supply port 60 (e.g., a pneumatic supply port), a delivery port 62 (e.g., a pneumatic delivery port) and a control port 66 (e.g., an electrical control port). The relay valve 44 includes a supply port 70 (e.g., a pneumatic supply (input) port), a delivery port 72 (e.g., a pneumatic delivery (output) port), and a control port 74 (e.g., a pneumatic control port). The check valve 46 includes a pneumatic supply port 76 (e.g., input port) and a pneumatic delivery port 80 (e.g., output port). The restrictor 50 includes an pneumatic supply port 82 (e.g., input port) and a pneumatic delivery port 84 (e.g., output port).

In the illustrated embodiment, both the relay valve supply port 70 and the restrictor input port 82 fluidly communicate with the control module supply port 30. Both the first control valve supply port 52 and the check valve supply port 76 fluidly communicate with the control module control port 32. Each of the first control valve delivery port 54, the second control valve delivery port 62 and the check valve delivery port 80 fluidly communicates with relay valve control port 74. The check valve 46 opens to permit fluid communication between the check valve supply port 76 and the check valve delivery port 80 when a pressure of the pneumatic fluid at the check valve supply port 76 is greater than a pressure at the check valve delivery port 80 by a predetermined amount; otherwise, the check valve 46 remains closed to prevent fluid communication between the check valve supply port 76 and the check valve delivery port 80. The relay valve delivery port 72 fluidly communicates with the control module delivery port 34.

The higher of the respective supply pressures of the pneumatic fluid at the first and second pneumatic supply ports $22_{1,2}$, which is present at both the first and second pneumatic delivery ports $24_{1,2}$, is fluidly communicated to the control module supply port 30 as a control module supply pressure. The control module supply pressure is, therefore, fluidly communicated to the restrictor input port 82 and the relay valve supply port 70. The restrictor output port 84 fluidly communicates the control module supply pressure to the second control valve supply port 60. The restrictor 50 slows airflow from the first and second reservoirs 16, 20 to help control the second control valve 42. In addition, the restrictor 50 allows a leak from the supply port 60 to the control port 62 of the second control valve 42 to exhaust through the delivery port 54 of the first control valve 40 before such a leak acts on the control port 74 of the relay valve 44.

The control module control port 32 receives a pneumatic control signal, based on a level of operator demanded braking, from an output port 90 of a double check valve 92. For example, the operator of an associated vehicle combination 12 depresses a pedal of a foot valve (not shown) to demand braking. The level of the operator demanded braking is dependent on an amount the pedal is depressed. The pneumatic fluid from the first and second reservoirs 16, 20 is fluidly transmitted to respective first and second input ports $94_1$, $94_2$ of the double check valve 92 based on the level of operator demanded braking. The higher of the respective pneumatic pressures at the first and second input ports $92_1$, $92_2$ is fluidly communicated to the double check valve output port 90 and, therefore, to the control module control port 32. The higher of the respective pneumatic pressures at the first and second input ports $92_1$, $92_2$ is also fluidly communicated from the control module control port 32 to both the first control valve supply port 52 and the check valve supply port 76.

Figure 2:
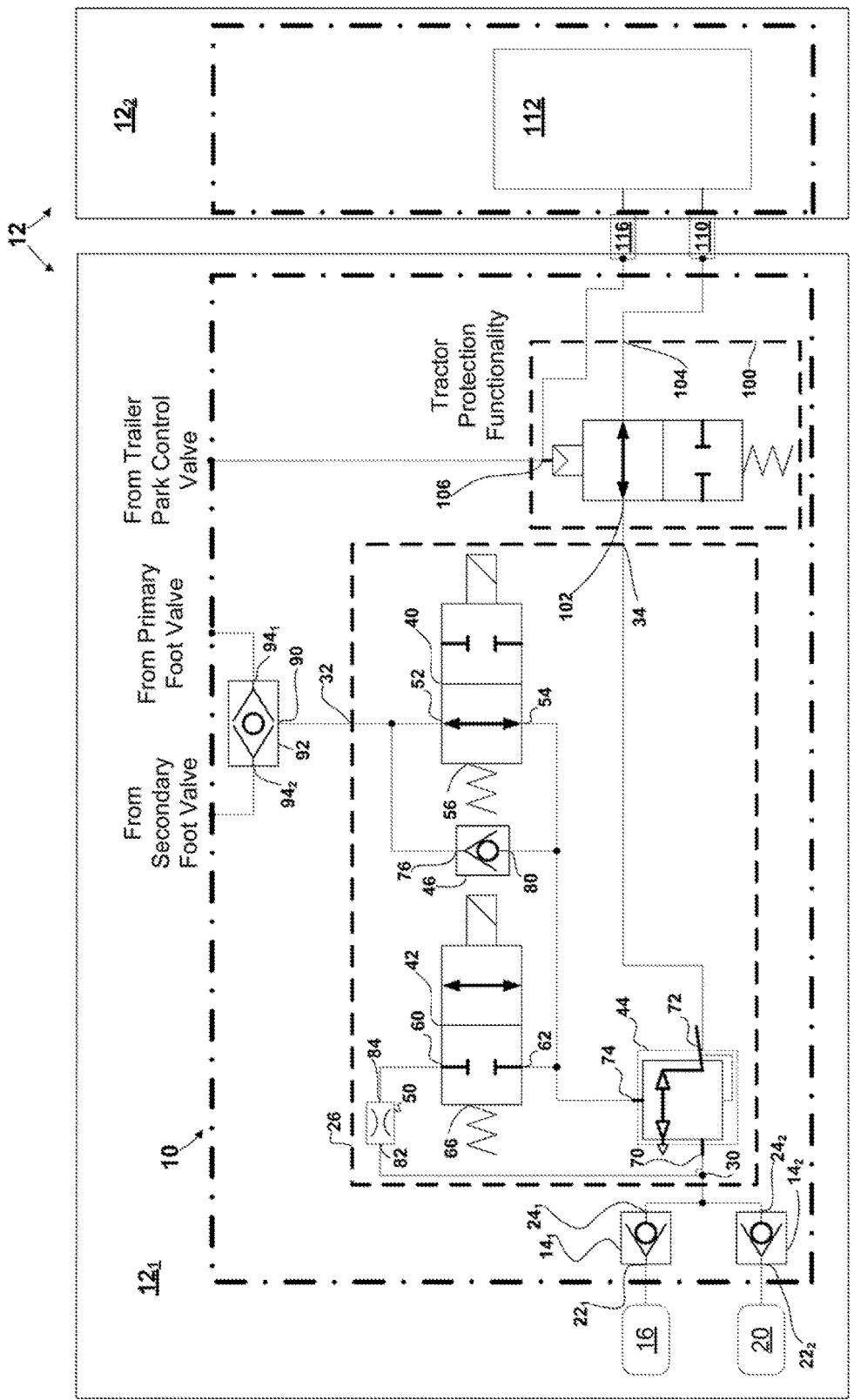
FIG. 2 illustrates a schematic representation of a simplified component diagram of an exemplary valve system in the first state while the associated vehicle is in a second state in accordance with one embodiment of an apparatus illustrating principles of the present invention.

A tractor protection module 100 includes a supply port 102 (e.g., input), a delivery port 104 (e.g., output) and a control port 106. The tractor protection supply port 102 fluidly communicates with the tractor protection delivery port 104 based on a pneumatic pressure at the tractor protection control port 106. In one embodiment, the pneumatic pressure at the tractor protection control port 106 is received from a trailer park control valve (not shown) and is referred to as a trailer park brake pressure. The trailer park brake pneumatic pressure at the tractor protection control port 106 (e.g., trailer park brake pressure) is at least a predetermined threshold if the associated vehicle combination 12 is in an unparked state (see FIG. 2) and below the predetermined threshold if the associated vehicle combination 12 is in a parked state (see FIG. 1). While the vehicle combination 12 is in the unparked state (see FIG. 2), the tractor protection supply port 102 fluidly communicates with the tractor protection delivery port 104 so that the pneumatic pressure at the tractor protection supply port 102 is fluidly communicated to the tractor protection delivery port 104, during which time the tractor protection module is also in an unparked state. While the vehicle combination 12 is in the parked state, as illustrated in FIG. 1, the tractor protection supply port 102 does not fluidly communicate with the tractor protection delivery port 104, during which time the tractor protection module is also in an parked state.

Figure 3:
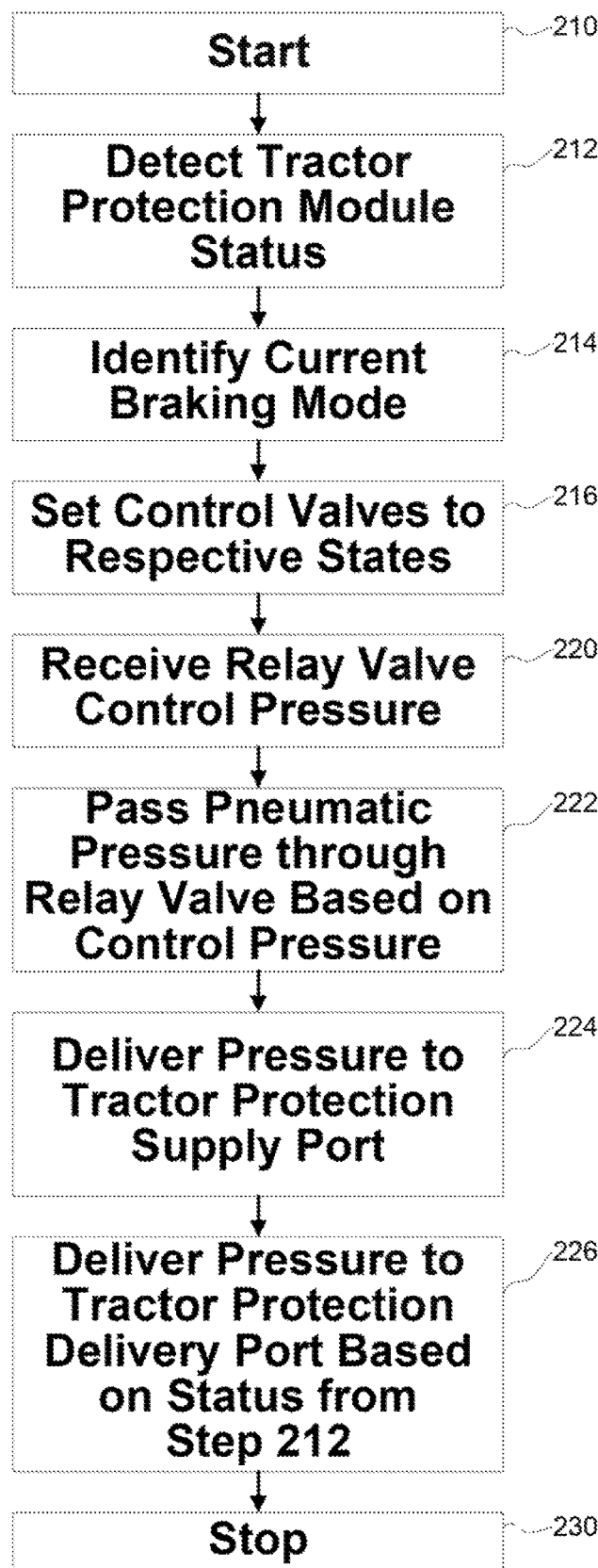
FIG. 3 is an exemplary methodology of controlling the valve system in accordance with one embodiment illustrating principles of the present invention.
Figure 4:
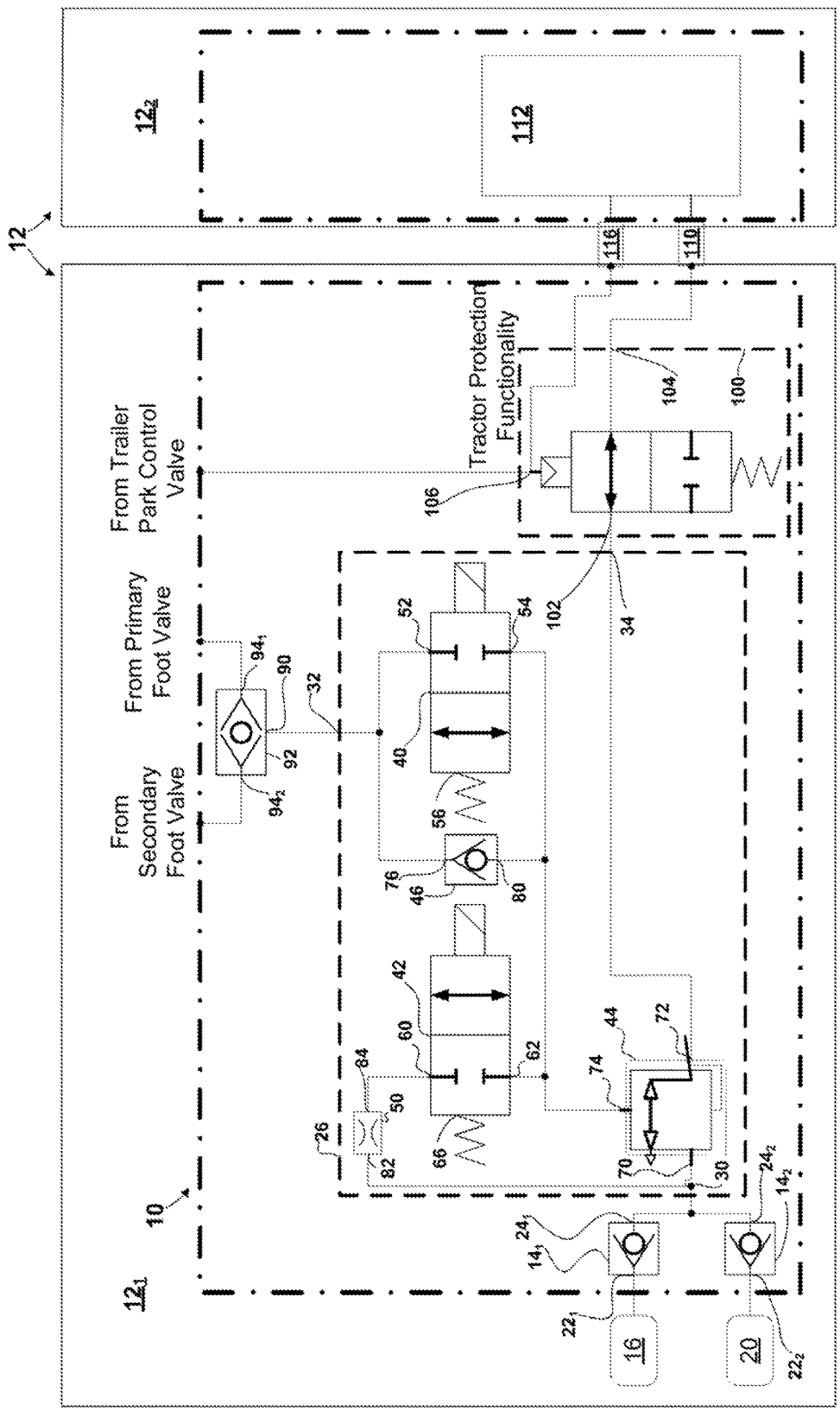
FIG. 4 illustrates a schematic representation of a simplified component diagram of an exemplary valve system in a second state while the associated vehicle is in the second state in accordance with one embodiment of an apparatus illustrating principles of the present invention.
Figure 5:
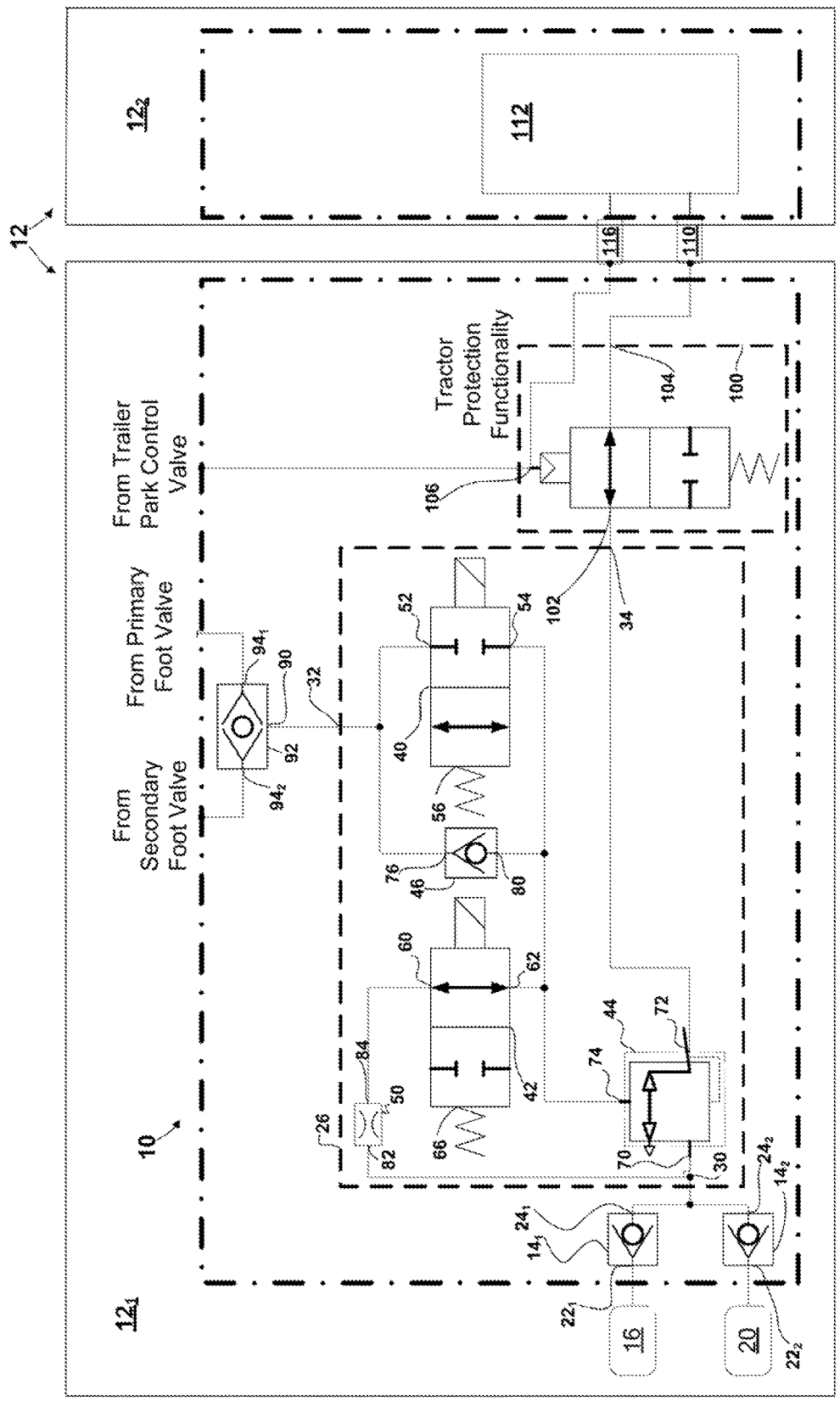
FIG. 5 illustrates a schematic representation of a simplified component diagram of an exemplary valve system in a third state while the associated vehicle is in the second state in accordance with one embodiment of an apparatus illustrating principles of the present invention.

With reference to FIG. 3, an exemplary methodology of the operation of the valve system 10 shown in FIGS. 1, 2, 4 and 5 is illustrated. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

With reference to FIGS. 1-5, the operation starts in a step 210. Then, in a step 212, the status of the tractor protection module 100 is detected. For example, the status of the tractor protection module 100 is detected in the step 212 as either "unparked" (see FIG. 2) or "parked" (see FIG. 1). In a step 214, a current braking mode is determined. For example, one of the following three (3) current braking modes is identified in the step 214: an operator initiated braking mode (see FIGS. 1 and 2), a system increasing pressure mode (see FIG. 5), and a system holding pressure mode (see FIG. 4). During the operator initiated braking mode (see FIGS. 1 and 2), the amount of braking of the associated vehicle combination 12 is based on how much the operator depresses the pedal of the foot valve. During the system increasing pressure mode (see FIG. 5), the amount of braking of the associated vehicle combination 12 is being increased by an automatic braking system (e.g., antilock braking system (ABS), electronic braking system (EBS), etc). During the system holding pressure mode (see FIG. 4), the amount of braking of the associated vehicle combination 12 is being held by the automatic braking system (e.g., antilock braking system (ABS), electronic braking system (EBS), etc).

Then, in a step 216, the first and second control valves 40, 42, respectively, are electronically controlled to be set in respective states based on the current braking mode. For example, if the current braking mode is the operator initiated braking mode (see FIGS. 1 and 2), then in the step 216 the first control valve 40 is set to an open state and the second control valve 42 is set to a closed state. If the current braking mode is the system increasing pressure mode (see FIG. 5), then in the step 216 the first control valve 40 is set to a closed state and the second control valve 42 is set to an open state. If the current braking mode is the system holding pressure mode (see FIG. 4), then in the step 216 both the first and second control valves 40, 42, respectively, are set to the closed state.

While in the open state, the first control valve 40 is set so that the first control valve supply port 52 fluidly communicates with the first control valve delivery port 54. Similarly, while in the open state, the second control valve 42 is set so that the second control valve supply port 60 fluidly communicates with the second control valve delivery port 62. While in the closed state, the first control valve 40 is set so that the first control valve supply port 52 does not fluidly communicate with the first control valve delivery port 54. Similarly, while in the closed state, the second control valve 42 is set so that the second control valve supply port 60 does not fluidly communicate with the second control valve delivery port 62.

In a step 220, the relay valve control port 74 receives a relay valve control pressure from at least one of the first control valve 40, the second control valve 42 and the check valve 46. For example, if the first control valve 40 is set to the open state and the second control valve 42 is set to a closed state (e.g., if the current braking mode is the operator initiated braking mode), the relay valve control pressure is received from the first control valve 40 and represents the level of operator demanded braking. If the first control valve 40 is set to the closed state and the second control valve 42 is set to a open state (e.g., if the current braking mode is the system increasing pressure braking mode), the relay valve control pressure is received from the second control valve 42 and represents the level of system demanded braking. If both the first control valve 40 is set to the closed state and the second control valve 42 is set to a closed state (e.g., if the current braking mode is the system holding pressure braking mode), the relay valve control pressure is received from the check valve 46 and represents the level of system demanded braking during, for example, a hill start assist or a level of operated demanded braking during an operator override mode.

In a step 222, the relay valve 44 passes the pneumatic pressure at the control module supply port 30 to the control module delivery port 34 based on the pneumatic pressure received at the relay valve control port 74.

In one embodiment, the pneumatic pressure at the control module supply port 30 is passed to the control module delivery port 34 when the pneumatic pressure at the relay valve control port 74 is above a pressure at the control module delivery port 34. It is also contemplated in this embodiment that the pneumatic pressure at the control module supply port 30 is not passed to the control module delivery port 34 (e.g., the pneumatic pressure at the relay valve control port 74 is about zero (0) psi) when the pneumatic pressure at the relay valve control port 74 is not above the pressure at the relay valve delivery port 72.

In another embodiment, the pneumatic pressure passed from the control module supply port 30 to the control module delivery port 34 changes as the pneumatic pressure at the relay valve control port 74 changes.

In a step 224, the pneumatic pressure at the control module delivery port 34 is delivered to the control module delivery port 34 and, consequently, the tractor protection module supply port 102.

Then, in a step 226, the pneumatic pressure at the tractor protection module supply port 102 is delivered to the tractor protection delivery port 104 based on the status of the tractor protection module 100 detected in the step 212. For example, if the status of the tractor protection module 100 is unparked (see FIG. 2), the pneumatic pressure at the tractor protection delivery port 104 is transmitted, during the step 226, to a control glad-hand 110, which fluidly communicates with a park brake system 112 on the trailer 12₂ of the vehicle combination 12. A supply glad-hand 116 fluidly communicates with park brake system 112. The park brake system 112 on the trailer 12₂ is controlled based on the pneumatic pressure delivered from the tractor protection delivery port 104. On the other hand, if the status of the tractor protection module 100 is parked (see FIG. 1), the pneumatic pressure at the tractor protection delivery port 104 is not transmitted to the control glad-hand 110 during the step 226.

The operation stops in a step 230.

In one embodiment, it is contemplated that the at least one isolation check valve 14, the first control valve 40, the second control valve 42, the control module check valve 46, the relay valve 44 and the tractor protection module 100 act as a means for controlling the pressure at the delivery port 104 of the tractor protection module 100.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A valve system, including:
    an isolation check valve delivering pneumatic fluid as a supply pressure;
    a double-check valve adapted to deliver a braking demand control signal of the pneumatic fluid based on a higher of a first braking demand in a first pneumatic braking circuit and a second braking demand in a second pneumatic braking circuit;
    a control module adapted to:
        receive the supply pressure as a control module supply pressure of the pneumatic fluid;
        receive a control module control pressure of the pneumatic fluid based on the braking demand control signal; and
        deliver a control module delivery pressure of the pneumatic fluid based on the control module supply pressure and the control module control pressure; and
    a tractor protection module delivering the pneumatic fluid at the control module delivery pressure based on a trailer park brake pressure of the pneumatic fluid, the tractor protection module delivering the pneumatic fluid at the control module delivery pressure when the trailer park brake pressure of the pneumatic fluid is set to an unparked state.

2. The valve system as set forth in claim 1, wherein:
    if the trailer park brake pressure is above a predetermined tractor protection supply pressure, the tractor protection module delivers the pneumatic fluid at the control module delivery pressure.

3. The valve system as set forth in claim 2, wherein:
    if the trailer park brake pressure is not above the predetermined tractor protection supply pressure, the tractor protection module does not deliver the pneumatic fluid.

4. The valve system as set forth in claim 1, wherein the control module includes a relay valve adapted to:
    receive a relay valve supply pressure of the pneumatic fluid based on the control module supply pressure;
    receive a relay valve control pressure of the pneumatic fluid based on one of i) the braking demand control signal and the ii) control module supply pressure; and
    deliver a relay control pressure of the pneumatic fluid, based on the relay valve supply pressure and the relay valve control pressure, as the control module delivery pressure.

5. The valve system as set forth in claim 4, wherein the control module further includes:
    a first control valve set to fluidly communicate the braking demand control signal as the relay valve control pressure based on a current braking mode; and
    a second control valve set to fluidly communicate the control module supply pressure as the relay valve control pressure based on the current braking mode.

6. The valve system as set forth in claim 5, wherein:
the current braking mode is one of an operator initiated braking mode, a system increasing pressure mode, and a system holding pressure mode;
the first control valve is set to fluidly communicate the braking demand control signal as the relay valve control pressure, while the second control valve set to not fluidly communicate the control module supply pressure as the relay valve control pressure, if the current braking mode is the operator initiated braking mode;
the second control valve is set to fluidly communicate the control module supply pressure as the relay valve control pressure, while the first control valve is set to not fluidly communicate the braking demand control signal as the relay valve control pressure, if the current braking mode is the system increasing pressure mode; and
neither the first control valve is set to fluidly communicate the braking demand control signal as the relay valve control pressure nor the second control valve is set to fluidly communicate the control module supply pressure as the relay valve control pressure if the current braking mode is the system holding pressure mode.

7. The valve system as set forth in claim 6, the control module further including:
a check valve adapted to fluidly communicate the braking demand control signal as the relay valve control pressure during the system holding pressure mode.

8. The valve system as set forth in claim 7, wherein:
the system holding pressure mode is active during a hill start assist.

9. The valve system as set forth in claim 6, the control module further including:
a check valve adapted to fluidly communicate the braking demand control signal as the relay valve control pressure during an operator override mode.

10. The valve system as set forth in claim 1, wherein:
the isolation check valve is a double-check valve delivering a higher of a first pneumatic reservoir pressure and a second pneumatic reservoir pressure as the supply pressure.

11. The valve system as set forth in claim 1, wherein:
the tractor protection module does not deliver the pneumatic fluid at the control module delivery pressure when the trailer park brake pressure of the pneumatic fluid is set to a parked state.

12. A valve system, including:
a first check valve including a first check valve pneumatic supply port and a first check valve pneumatic delivery port;
a second check valve including a second check valve pneumatic supply port and a second check valve pneumatic delivery port, the first check valve pneumatic delivery port fluidly communicating with the second check valve pneumatic delivery port and a higher of respective pneumatic supply pressures of a pneumatic fluid at the first and second check valve pneumatic supply ports being fluidly transmitted to the first and second check valve pneumatic delivery ports as a pneumatic supply pressure of the pneumatic fluid;
a double-check valve delivering a braking demand pneumatic fluid control signal based on a higher of a first braking demand in a first pneumatic braking circuit and a second braking demand in a second pneumatic braking circuit;
a control module, including:
a pneumatic supply port fluidly communicating with both the first and second check valve pneumatic delivery ports and fluidly receiving the pneumatic supply pressure of the pneumatic fluid;
a pneumatic control port receiving the braking demand pneumatic fluid control signal; and
a pneumatic delivery port delivering a pneumatic fluid at a delivery pressure based on the braking demand pneumatic fluid control signal; and
a tractor protection valve including a tractor protection valve input port, fluidly communicating with the control module pneumatic delivery port, and a tractor protection valve output port, the pneumatic fluid at the delivery pressure from the control module pneumatic delivery port being delivered from the tractor protection valve input port to the tractor protection output port based on a state of the tractor protection valve.

13. The valve system as set forth in claim 12, wherein:
the state of the tractor protection valve is one of unparked and parked.

14. The valve system as set forth in claim 13, wherein:
if the state of the tractor protection valve is unparked, the pneumatic fluid at the delivery pressure from the control module pneumatic delivery port being delivered from the tractor protection valve input port to the tractor protection output port; and
if the state of the tractor protection valve is parked, the pneumatic fluid at the delivery pressure from the control module pneumatic delivery port not being delivered from the tractor protection valve input port to the tractor protection output port.

15. The valve system as set forth in claim 12, wherein the control module further includes a relay valve including:
a relay valve input port fluidly communicating with the control module pneumatic supply port for receiving the pneumatic supply pressure of the pneumatic fluid as a relay valve supply pressure of the pneumatic fluid;
a relay valve control port fluidly receiving a relay valve control pressure of the pneumatic fluid based on one of i) the braking demand control signal and the ii) control module supply pressure; and
a relay valve delivery port fluidly delivering a relay valve control pressure of the pneumatic fluid, based on the relay valve supply pressure and the relay valve control pressure, as the control module delivery pressure.

16. The valve system as set forth in claim 15, wherein the control module further includes:
a first control valve set to fluidly communicate the braking demand control signal as the relay valve control pressure based on a current braking mode; and
a second control valve set to fluidly communicate the control module supply pressure as the relay valve control pressure based on the current braking mode.

17. The valve system as set forth in claim 16, wherein:
the current braking mode is one of an operator controlled braking mode, a system increasing pressure mode, and a system holding pressure mode;
the first control valve is set to fluidly communicate the braking demand control signal as the relay valve control pressure, while the second control valve set to not fluidly communicate the control module supply pressure as the relay valve control pressure, if the current braking mode is the operator initiated braking mode;
the second control valve is set to fluidly communicate the control module supply pressure as the relay valve control pressure, while the first control valve is set to not fluidly communicate the braking demand control signal as the relay valve control pressure, if the current braking mode is the system increasing pressure mode; and
neither the first control valve is set to fluidly communicate the braking demand control signal as the relay valve control pressure nor the second control valve is set to fluidly communicate the control module supply pressure as the relay valve control pressure if the current braking mode is the system holding pressure mode.

18. The valve system as set forth in claim 17, wherein the control module further includes:
a check valve adapted to fluidly communicate the braking demand control signal as the relay valve control pressure during the system holding pressure mode.

19. A method for controlling a pressure of a pneumatic fluid delivered from a tractor protection module, the method comprising:
delivering the pneumatic fluid from an isolation check valve at a supply pressure;
delivering a braking demand control signal of the pneumatic fluid, based on a higher of a first braking demand in a first pneumatic braking circuit and a second braking demand in a second pneumatic braking circuit, from a double-check valve;
receiving the supply pressure as a control module supply pressure of the pneumatic fluid;
receiving a control module control pressure of the pneumatic fluid based on the braking demand control signal;
delivering a control module delivery pressure of the pneumatic fluid based on the control module supply pressure and the control module control pressure; and
delivering the pneumatic fluid from the tractor protection module at the control module delivery pressure based on a trailer park brake pressure of the pneumatic fluid.

20. The method for controlling a pressure of a pneumatic fluid delivered from a tractor protection module as set forth in claim 19, the step of delivering the pneumatic fluid from the tractor protection module at the control module delivery pressure based on the trailer park brake pressure of the pneumatic fluid including:
if the trailer park brake pressure is above a predetermined tractor protection supply pressure, delivering the pneumatic fluid at the control module delivery pressure from the tractor protection module.

21. The method for controlling a pressure of a pneumatic fluid delivered from a tractor protection module as set forth in claim 19, the step of delivering the pneumatic fluid from the tractor protection module at the control module delivery pressure based on the trailer park brake pressure of the pneumatic fluid including:
if the trailer park brake pressure is in an unparked state, delivering the pneumatic fluid at the control module delivery pressure from the tractor protection module.

22. The method for controlling a pressure of a pneumatic fluid delivered from a tractor protection module as set forth in claim 19, further including:
receiving a relay valve supply pressure of the pneumatic fluid based on the control module supply pressure;
receiving a relay valve control pressure of the pneumatic fluid based on one of i) the braking demand control signal and the ii) control module supply pressure; and
delivering a relay control pressure of the pneumatic fluid, based on the relay valve supply pressure and the relay valve control pressure, as the control module delivery pressure.

23. The method for controlling a pressure of a pneumatic fluid delivered from a tractor protection module as set forth in claim 22, further including:
setting a first control valve to fluidly communicate the braking demand control signal as the relay valve control pressure based on a current braking mode; and
setting a second control valve to fluidly communicate the control module supply pressure as the relay valve control pressure based on the current braking mode.

24. The method for controlling a pressure of a pneumatic fluid delivered from a tractor protection module as set forth in claim 23, further including:
setting the current braking mode to one of an operator controlled braking mode, a system increasing pressure mode, and a system holding pressure mode;
setting the first control valve to fluidly communicate the braking demand control signal as the relay valve control pressure, while the second control valve set to not fluidly communicate the control module supply pressure as the relay valve control pressure, if the current braking mode is the operator initiated braking mode;
setting the second control valve to fluidly communicate the control module supply pressure as the relay valve control pressure, while the first control valve is set to not fluidly communicate the braking demand control signal as the relay valve control pressure, if the current braking mode is the system increasing pressure mode; and
setting neither the first control valve to fluidly communicate the braking demand control signal as the relay valve control pressure nor the second control valve to fluidly communicate the control module supply pressure as the relay valve control pressure if the current braking mode is the system holding pressure mode.

25. The method for controlling a pressure of a pneumatic fluid delivered from a tractor protection module as set forth in claim 24, further including:
fluidly communicating the braking demand control signal via a check valve as the relay valve control pressure during the system holding pressure mode.

26. The method for controlling a pressure of a pneumatic fluid delivered from a tractor protection module as set forth in claim 25, further including:
setting the mode as the system holding pressure mode during a hill start assist event.

* * * * *